(12) United States Patent
Heizenroeder

(10) Patent No.: US 10,982,789 B2
(45) Date of Patent: Apr. 20, 2021

(54) GAS METERS HAVING HIGH PRESSURE SHUT-OFF VALVES AND RELATED GAS FLOW CONTROL SYSTEMS

(71) Applicant: Sensus Spectrum, LLC, Morrisville, NC (US)

(72) Inventor: Christian Heizenroeder, Durham, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 43 days.

(21) Appl. No.: 16/275,720

(22) Filed: Feb. 14, 2019

(65) Prior Publication Data

US 2020/0263805 A1    Aug. 20, 2020

(51) Int. Cl.
| | |
|---|---|
| *G01F 15/00* | (2006.01) |
| *F16K 31/46* | (2006.01) |
| *F16K 31/44* | (2006.01) |
| *F16K 31/00* | (2006.01) |
| *F16K 5/06* | (2006.01) |
| *F16K 41/02* | (2006.01) |
| *F16K 41/06* | (2006.01) |

(52) U.S. Cl.
CPC ............ *F16K 31/46* (2013.01); *F16K 5/0694* (2013.01); *F16K 31/002* (2013.01); *F16K 31/44* (2013.01); *F16K 41/026* (2013.01); *F16K 41/066* (2013.01); *G01F 15/005* (2013.01); *Y10T 137/7043* (2015.04); *Y10T 137/7062* (2015.04)

(58) Field of Classification Search
CPC ............. G01F 15/005; Y10T 137/7043; Y10T 137/7062; F16K 31/44; F16K 31/46; F16K 5/0285; F16K 5/0485; F16K 5/0694; F16K 41/023–026; F16K 41/046; F16K 41/066
USPC ................................... 73/195, 198, 199, 201
See application file for complete search history.

(56) References Cited

U.S. PATENT DOCUMENTS

| | | | | |
|---|---|---|---|---|
| 5,555,907 A | * | 9/1996 | Philipp | ...................... E03C 1/02 137/312 |
| 5,590,680 A | * | 1/1997 | Gugala | ................. F16K 5/0694 137/312 |
| 5,918,618 A | * | 7/1999 | Neupert | ................... F16K 1/123 137/14 |
| 6,170,509 B1 | * | 1/2001 | Karta | ..................... F16K 31/566 137/78.4 |
| 7,604,216 B2 | * | 10/2009 | Gebler | ................. F16K 5/0652 251/129.11 |
| 8,305,231 B2 | * | 11/2012 | Fujii | ..................... G01F 15/005 340/870.02 |
| 9,928,724 B2 | * | 3/2018 | Alcorn | ....................... G01F 1/34 |
| 2008/0188991 A1 | * | 8/2008 | Mulligan | .............. G01M 3/022 700/282 |
| 2018/0306617 A1 | * | 10/2018 | Bonomi | ................ F16K 27/067 |

* cited by examiner

*Primary Examiner* — Kevin F Murphy
(74) *Attorney, Agent, or Firm* — Stanek Lemon Crouse & Meeks, PA

(57) ABSTRACT

Gas meters including a first portion and a second portion are provided. The first portion is separate and distinct from the second portion and a physical barrier is positioned between the first portion and the second portion. The first portion includes at least a motor associated with a shut-off valve for the gas meter and the second portion includes at least an area for a gas stream to flow through. Related gas regulating devices are also provided herein.

10 Claims, 6 Drawing Sheets

US 10,982,789 B2

GAS METERS HAVING HIGH PRESSURE SHUT-OFF VALVES AND RELATED GAS FLOW CONTROL SYSTEMS

FIELD

The present inventive concept relates generally to pressure and flow regulators and, more particularly, to gas valves capable of being controlled remotely for gas flow.

BACKGROUND

Utilities are not generally in the business of disconnecting service. However, sometimes utilities, such as gas companies, dispatch thousands of orders to shut-off service for a variety of reasons, for example, safety, move outs or collections activities. A shut-off valve for residential or commercial gas meters generally involves providing a motor in the gas meter to shut-off the gas meter in these situations. The motor typically has limited energy such that any "spark" created by the motor would not cause the gas in the meter to ignite. However, these limited energy motors also generally have limited torque, which only allows the motor to "shut-off" gas having relatively low pressures. Improved gas "shut-off" systems are desired.

SUMMARY

Some embodiments of the present inventive concept provide gas meters including a first portion and a second portion. The first portion is separate and distinct from the second portion and a physical barrier is positioned between the first portion and the second portion. The first portion includes at least a motor associated with a shut-off valve for the gas meter and the second portion includes at least an area for a gas stream to flow through.

In further embodiments, the first portion of the gas meter may further include a gear box coupled to the motor. The second portion of the gas meter may further include a valve housing for the shut-off valve. A shaft may be provided between the first and second portions of the gas meter. The shaft may couple the motor in the first portion and the shut-off valve in the second portion. The physical barrier may include an o-ring positioned around the shaft between the first and second portions of the gas meter.

In still further embodiments, the first portion may include all high energy components of the gas meter.

In some embodiments, the gas meter may be one of a residential gas meter and a commercial gas meter.

In further embodiments, the shut-off valve may be configured to shut-off pressures greater than 25 PSI.

In still further embodiments, the shut-off valve may operate responsive to one or more of a direct command to shut-off, a temperature sensor, a pressure sensor and a vibration sensor.

Some embodiments of the present inventive concept provide a gas flow control system including a shut-off valve associated with a gas meter; and a motor coupled to the shut-off valve and configured to activate the shut-off valve responsive to a parameter indicating to shut-off gas flowing through the gas meter. The motor is positioned in the gas meter such that the motor is physically separated from the gas flowing through the gas meter.

DETAILED DESCRIPTION

Figure 1:
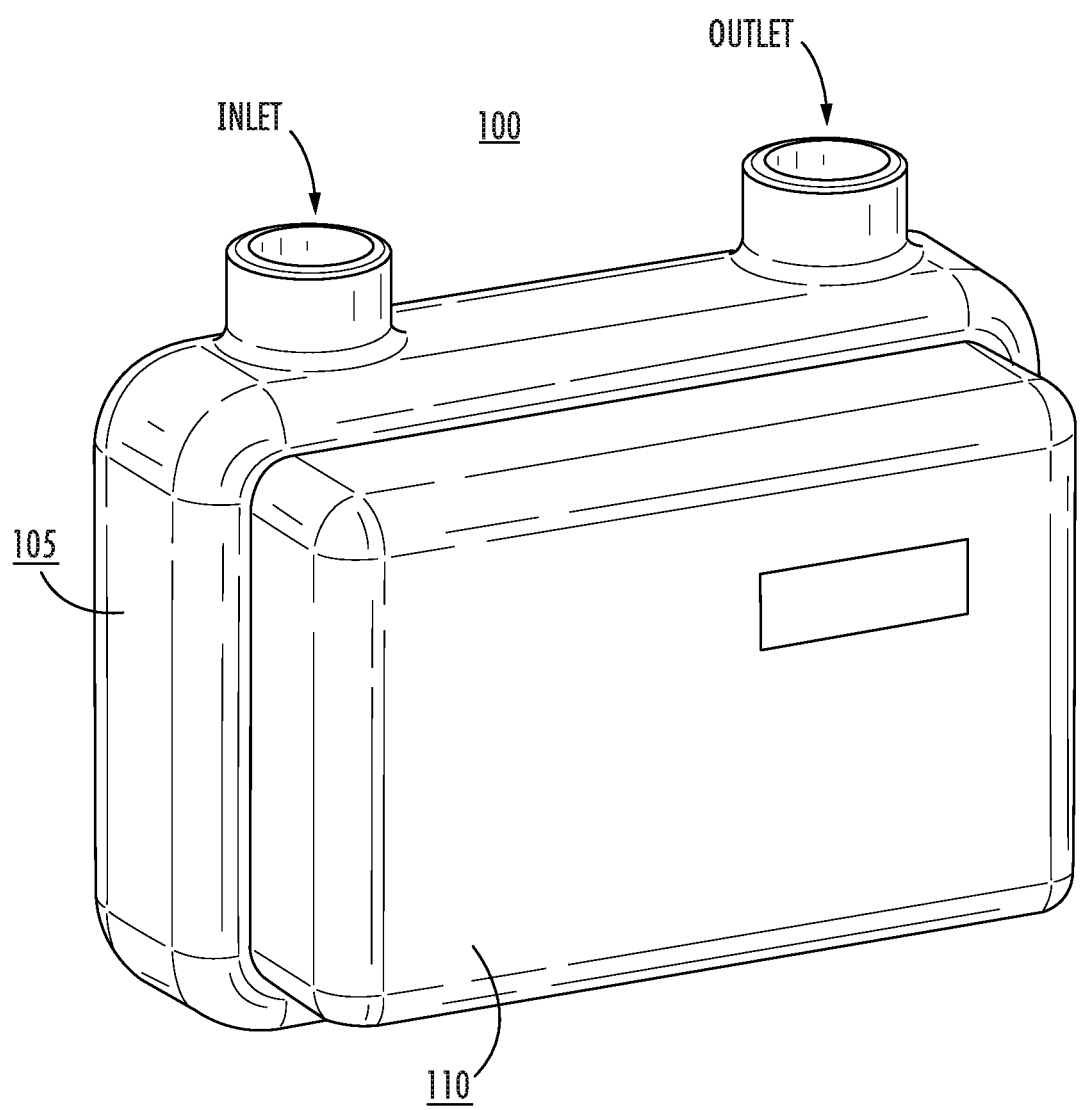
FIG. 1 is a perspective view of a gas meter in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, there is an inherent danger in having motor used to "shut-off" gas flowing through gas meters, as any high energy device that comes in contact with the gas may cause a spark that could cause the gas to ignite. In particular, standards in Europe and the United States, for example, EN 60079-11, classify areas that are or can be potentially explosive in zones (Europe: Zone 0, 1, 2) or divisions (US: DIV 1, DIV 2, . . . ).

A gas meter and the related inner and outer environment are classified into such areas to determine what safety measure must be taken as gas being present makes the meter potentially explosive when exposed to certain elements, for example, a high energy motor. Equipment/devices installed in those specified areas generally need to fulfill certain standards.

For example, certain high power electrical equipment that could potentially generate sparks, referred to herein as "spark generating equipment," generally cannot be installed in areas where an explosive medium is present. Thus, a challenge with developing a shut-off valve for a gas meter is that spark generating equipment, for example, a direct current (DC) motor, may need to be installed within the gas meter. The motor, by definition, will be surrounded by gas all the time. This environment is, by itself, not explosive, but can easily become explosive when air is mixed into the gas, for example, when gas pipes rupture.

Thus, motors or spark generating equipment installed in gas meters generally have limited energy supplied thereto. If the energy is limited enough, it will not ignite the explosive atmosphere, for example, gas. The torque provided by these motors is generally very low and, therefore, can only control gas meters having low gas pressures, for example, 0.25 PSI. However, customers are routinely asking for "shut-off" valves in higher PSI environments, for example, 25 PSI or more. To be able to shut-off the gas in a higher pressure environment, a stronger motor is needed, but the stronger motor uses more energy and may ignite the explosive atmosphere. Accordingly, some embodiments of the present inventive concept provide a gas meter having a physical separation between the gas flowing through the meter and the spark generating devices in the meter, for example, a motor associated with a shut-off valve. For example, the shut-off valve may be positioned in one portion of the gas meter and the motor may be positioned in as second portion of the gas meter that is physically separated from gas flowing through the meter. The physical separation may be provided by a physical barrier between the explosive environment (gas) and the spark generating device (motor) as will be discussed further herein with respect to FIGS. 1 through 6 below.

Referring first to FIG. 1, a perspective view of gas meter 100 in accordance with some embodiments of the present inventive concept will be discussed. This gas meter 100 could be a residential or commercial gas meter without departing from the scope of the present inventive concept and has both an Inlet and Outlet for the gas as shown. As illustrated, the gas meter 100 includes first 105 and second 110 portions, the first portion 105 being larger than the second portion 110. The gas meter 100 is provided as an example only and, therefore, embodiments of the present inventive concept are not limited thereto.

Figure 2:
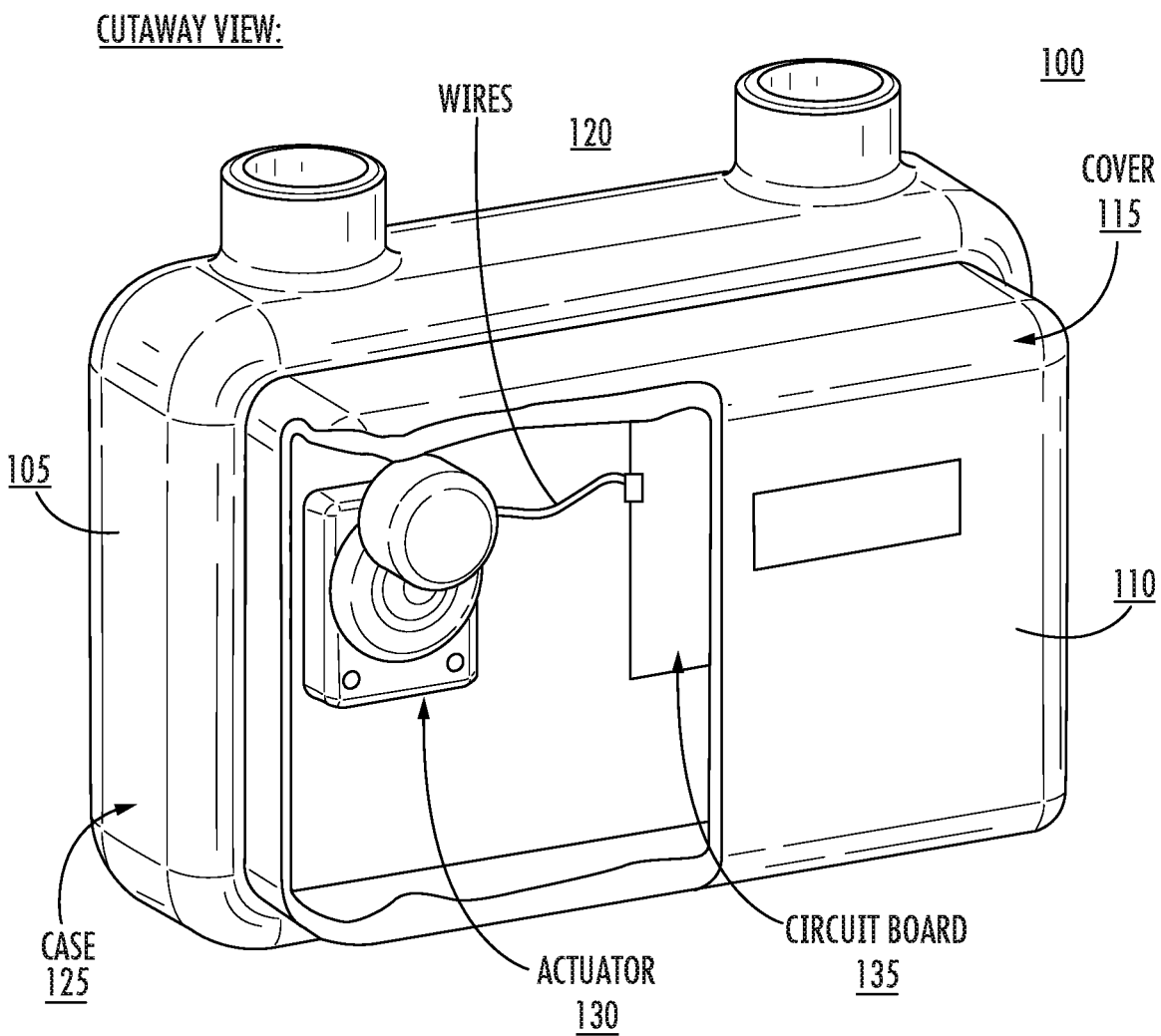
FIG. 2 is a perspective view of a gas meter having a portion of the cover cutaway in accordance with some embodiments of the present inventive concept.

FIG. 2 is a diagram of the gas meter 100 having a cover of the second portion 110 partially removed to reveal an interior of the second portion 110. As shown, the meter 100 includes a case 125 and cover 115. The interior of the second portion 110 includes an actuator (motor/solenoid/gear box) 130, wires 120 and circuit board 135 for the meter 100. More or fewer elements may be included in the interior of the second portion 110 without departing from the scope of the present inventive concept.

Figure 3B:
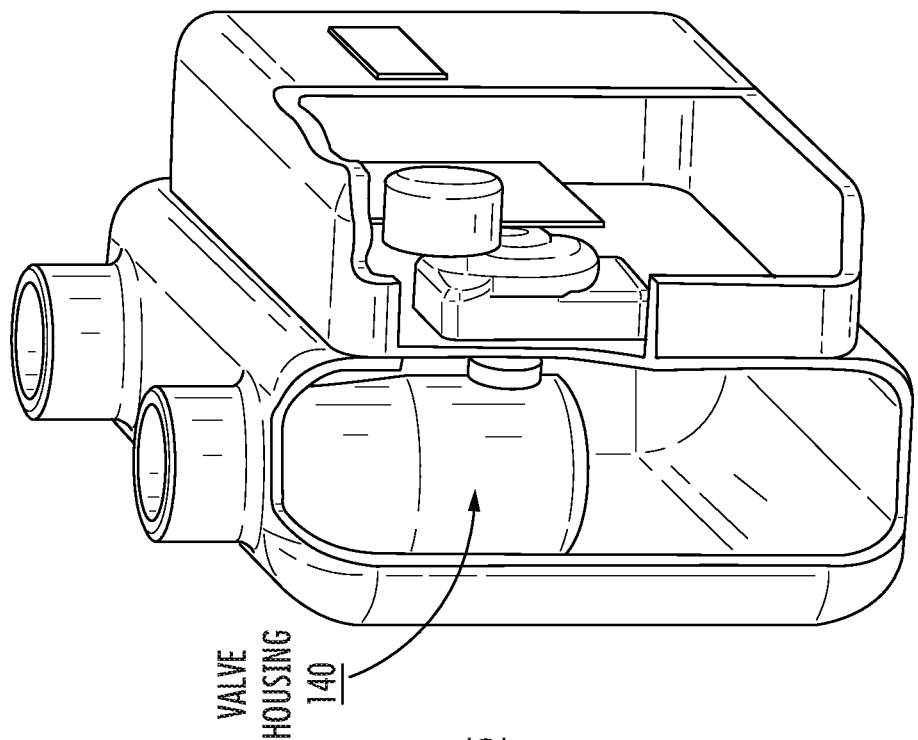
FIGS. 3A and 3B are a cross-section and side view, respectively, of gas meters in accordance with some embodiments of the present inventive concept.
Figure 3A:
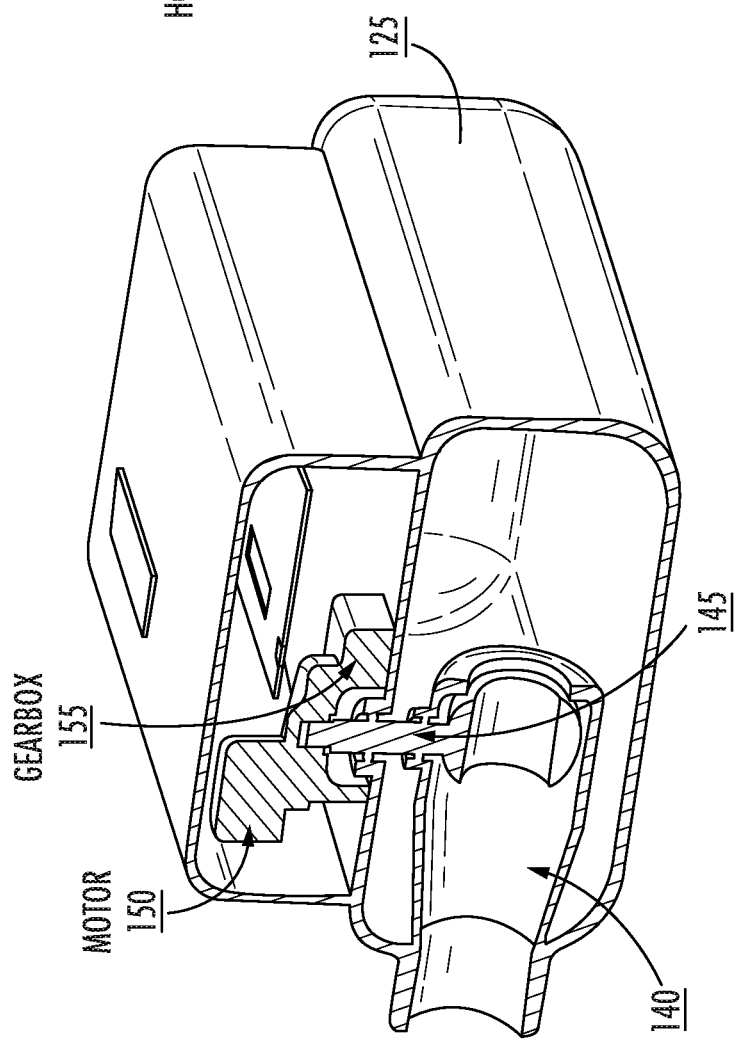

FIG. 3A is a cross-section of the gas meter 100 illustrating the interior of the first and second portions 105 and 110. FIG. 3B is a side view of the meter 100 with portions of the case and cover removed to reveal interiors of the first and second portions 105 and 110. As illustrated in FIG. 3A, a valve housing 140 for the shut-off valve is connected to the actuator 130 (motor 150 and gearbox 155) through the shaft 145. In operation, gas would fill the case 125. The valve housing 140 and the gas would be separate and isolated from the motor 150 and gearbox 155 (sparking generating devices).

Figure 4:
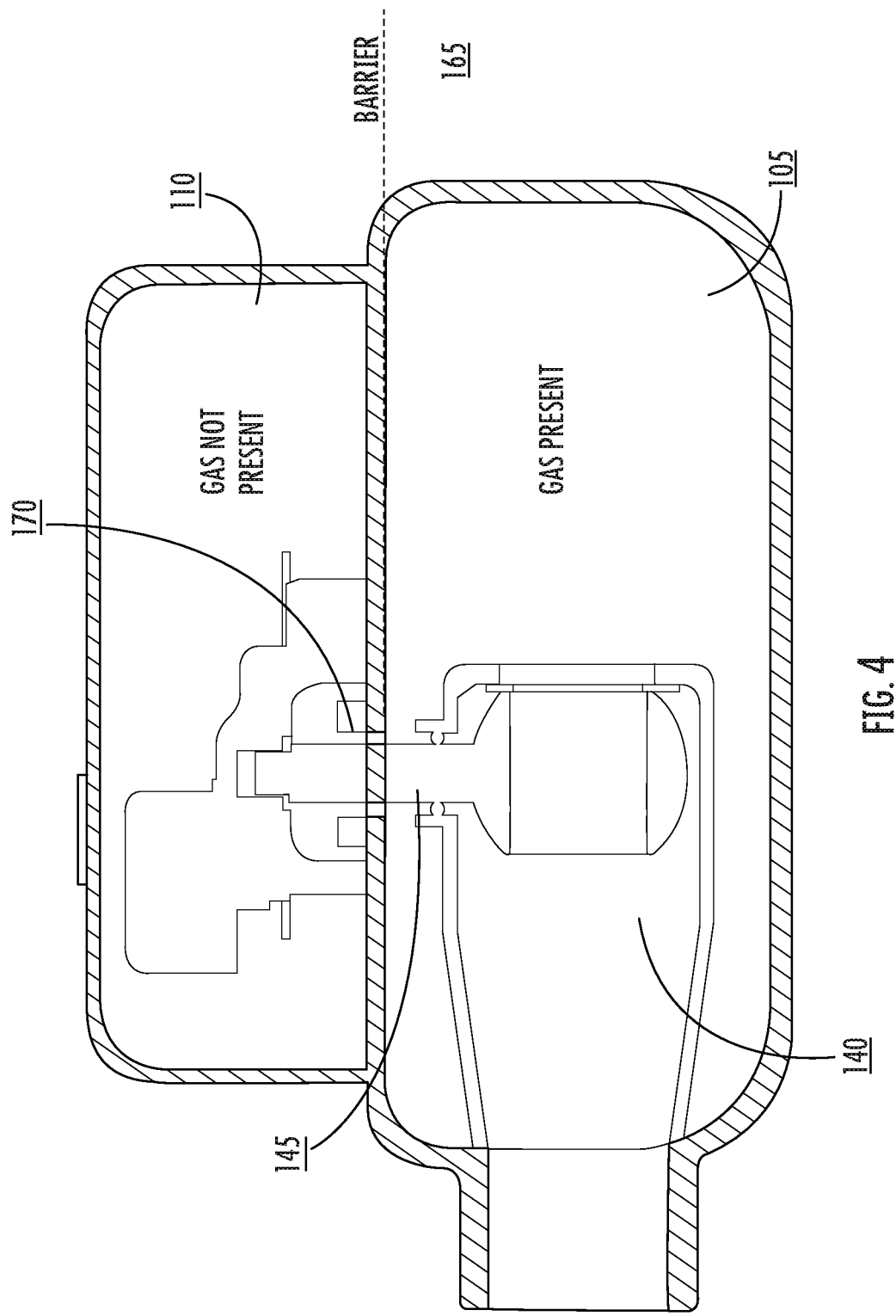
FIG. 4 is a cross-section showing first and second portions of the meter in accordance with some embodiments of the present inventive concept.

In particular, as shown in the cross-section of the meter in FIG. 4, the first portion 105 of the meter 100 is filled with gas and the second portion 110 of the meter 100 does not have any gas present therein. Furthermore, a physical barrier 165 is provided between the gas filled area and the area where no gas is present. As is clear, areas where gas is present potentially provide an explosive environment and, thus, only very low energy components/motors can be placed into the this area. In some embodiments, higher energy components (actuator and the electronics) may be positioned in the second portion 110 as discussed above and not in the gas filled area 105. Only the valve housing 140 including the shut-off valve is positioned in the gas stream, no high energy electronics. The barrier 165 provided between the first portion 105 and the second portion 110 is the shaft 145 from the valve going to the motor 150 and is sealed with an O-ring 170. It will be understood that embodiments of the present inventive concept are not limited to this configuration and other barriers may be used without departing from the scope of the present inventive concept.

Figure 5:
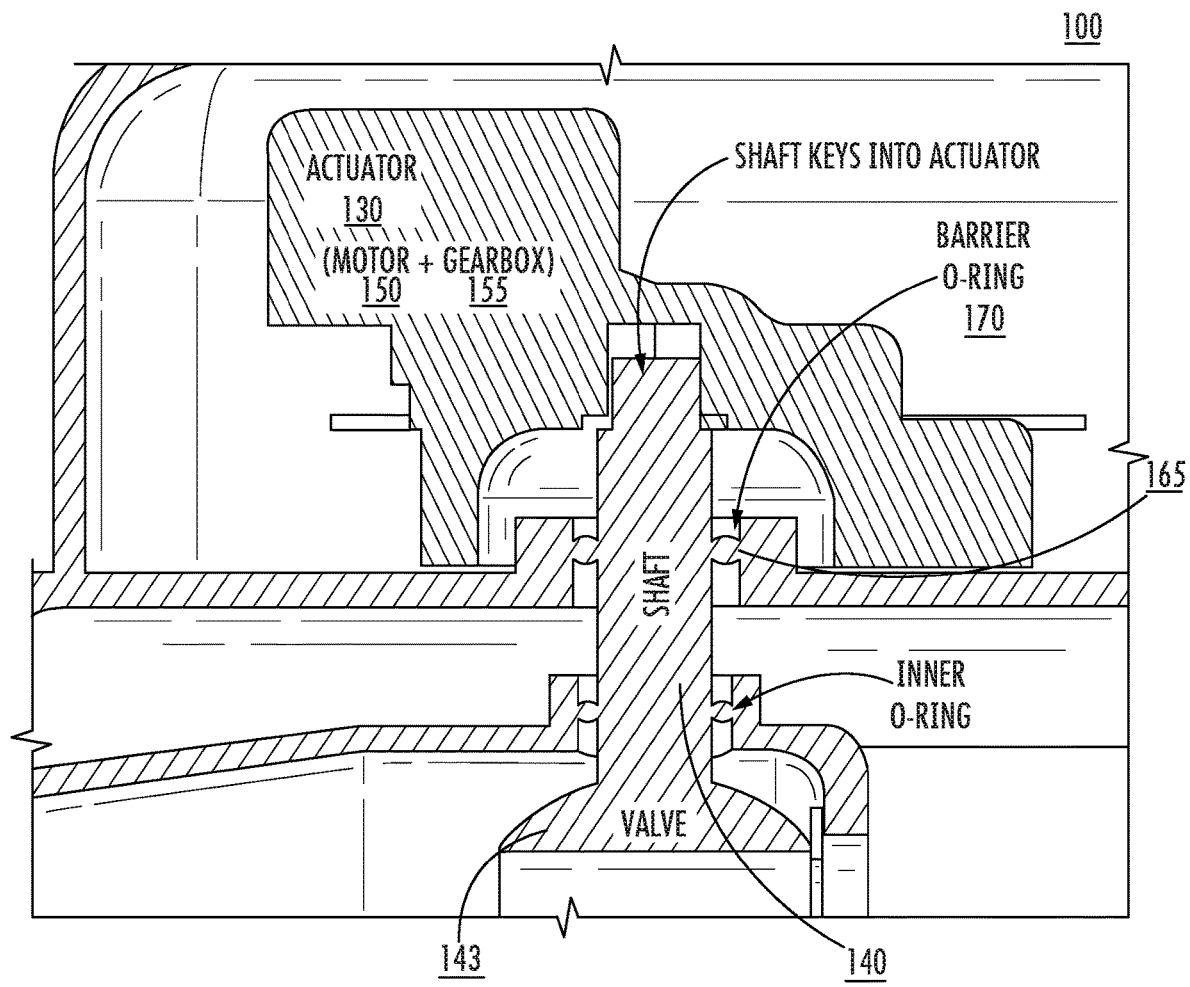
FIG. 5 is a more detailed cross-section of the meter in accordance with some embodiments of the present inventive concept.

Referring now to FIG. 5, details of a magnified cross-section of the gas meter 100 will be discussed. As illustrated, the shaft 145 connects the first and second portions 105 and 110. The o-ring 170 provides a seal for the barrier 165. As illustrated, the actuator 130, the motor 150 and the gearbox 155 is placed outside the gas stream (flow of gas through the meter). Only mechanical components or low energy electronics, for example, a ball valve, ball, sealing washers, housing and the like are placed in the gas stream. The actuator 130 drives the shaft 140 and the shaft 140 drives the shut-off valve. The shut-off valve may be activated responsive to an indication that some parameter, for example, temperature, pressure, vibration and the like, is out of a specified range. These parameters may be sensed by one or more sensors 637 in the meter. In some embodiments, the shut-off valve may be activated responsive to a direct command to shut-off.

The valve 143 can be, for example, a ball valve, slam shut, ¼ ball valve, or any other kind of mechanism without departing from the scope of the present inventive concept. Thus, embodiments of the present inventive concept provide the "spark generating devices"/elements of the meter, for example, the actuator 130, separate from the explosive environment, i.e. the gas.

Although embodiments of the present inventive concept are discussed as having the actuator, motor and gear box separate from the gas chamber, embodiments of the present inventive concept are not limited thereto. For example, the in some embodiments the gear box may be provided in the gas stream and only the motor may be placed outside the gas stream.

As discussed briefly above, as the demand for meters that can handle much higher pressures, for example, 25 PSI, the ability to provide a shut-off valve in the gas stream decreased. In other words, the motors required to shut-off higher pressures would be "spark causing" and, therefore, unsafe to use in the shut-off mechanism. Accordingly, embodiment of the present inventive concept separate the motor and the valve and place the motor outside the gas flow. Thus, motors capable of shutting off higher pressures could be used without dealing with a concern for explosion of fire. Thus, embodiments of the present inventive concept provide shut-off valves for residential and commercial gas meters that can shut-off (and/or regulate) against higher gas pressures, for example, greater than 0.25 PSI, while being safe to use in explosive environments/zones specified in EN 60079-10 or IEC 60079.

Thus, some embodiments of the present inventive concept provide more freedom in selecting the motor because the motor itself does not necessarily have to be intrinsically safe and use of higher powered motors is possible. Separating the motor from the gas stream leads to fewer safety concerns overall. Furthermore, even in situations where the power of the motor is low enough to be included in the gas stream, the life of the motor may be effected. In other words, motor/gears in the gas flow can suffer from corrosion, and the like.

Embodiments of the present inventive concept provide gas flow control systems inside the gas meter to regulate the flow of gas therethrough. As discussed above, much higher pressure streams of gas may be regulated by separating the spark generating devices from the gas stream.

Figure 6:
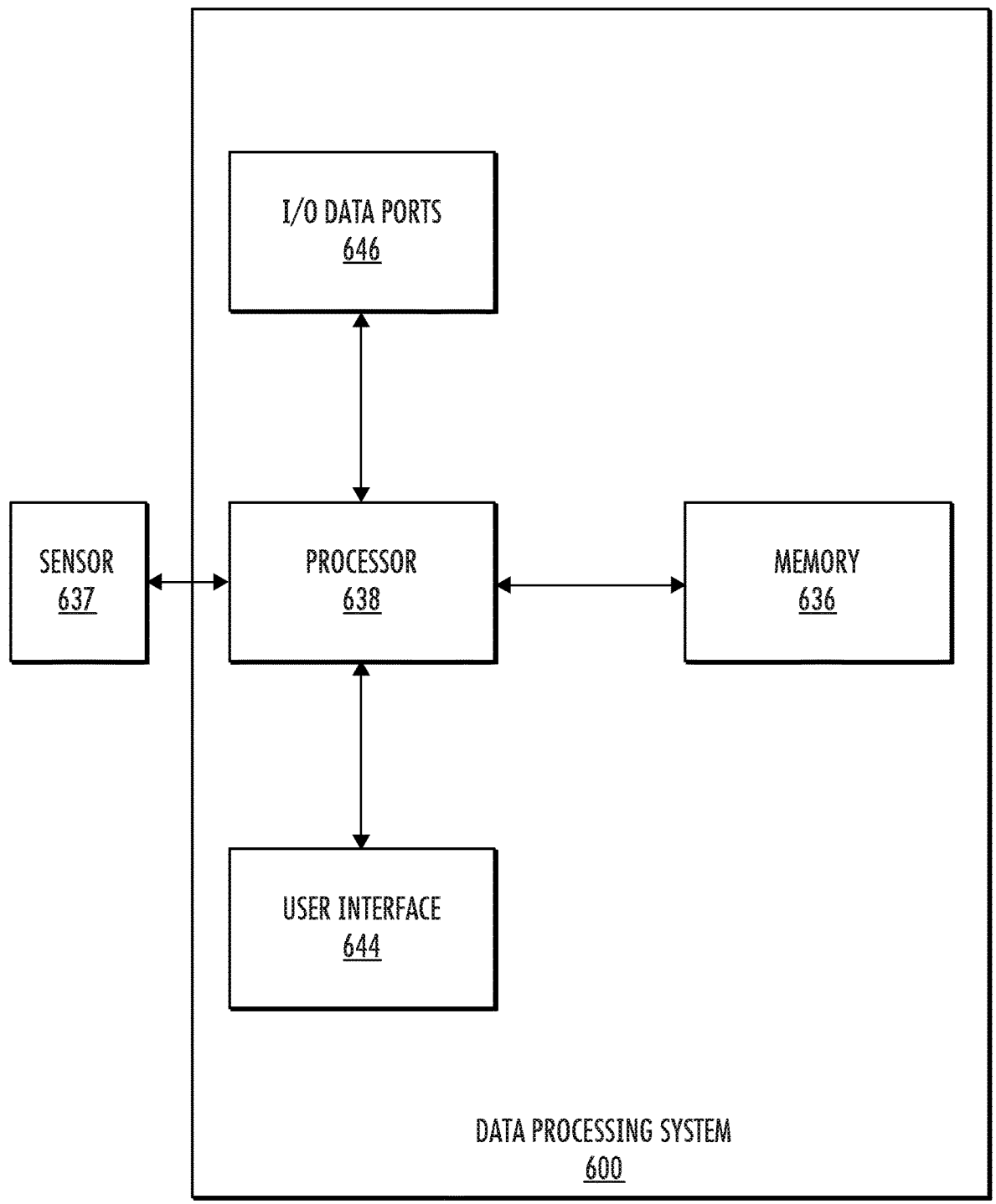
FIG. 6 is a block diagram of a data processing system and related sensors that can be used in accordance with some embodiments of the present inventive concept.

In some embodiments, the meter 100 may be a "smart meter." As used herein, a smart meter is a meter that can communicate with other devices in remote locations. Thus, in embodiments of the present inventive concept using smart meters, the pressure relief valve may be activated remotely. In these embodiments, the communication circuit in the smart meter would communicate with a remote location over a network and the commands would be processed and performed using a data processing system. FIG. 6 is an example embodiment of a data processing system 600 suitable for use in accordance with some embodiments of the present inventive concept will be discussed. For example, the data processing system 600 may be provided at the remote location, at the pressure regulating system or both without departing from the scope of the present inventive concept. The data processing system 600 may also communicated with sensors 637 present in the gas meter 100 in some embodiments. As illustrated in FIG. 6, the data processing system 600 includes a user interface 644 such as a display, a keyboard, keypad, touchpad or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein. This data processing system 600 may be included in any type of computing device without departing from the scope of the present inventive concept.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A gas meter comprising:
   a housing comprising a first portion and a second portion, the first portion of the housing being separate and distinct from the second portion of the housing and a first physical barrier positioned between the first portion of the housing and the second portion of the housing, wherein the first portion of the housing comprises at least a motor associated with a shut-off valve for the gas meter;
   a valve housing positioned in the second portion of the housing, the shut-off valve being positioned in the valve housing in the second portion of the housing;
   a second physical barrier between the valve housing and the valve,
   wherein the first portion of the housing of the gas meter further comprises a gear box coupled to the motor;
   wherein the second portion comprises at least an area for a gas stream to flow through; and
   wherein the first and second portions of the housing of the gas meter are configured to fit together as a case and cover for the gas meter and provide a single contiguous unit; and
   a shaft that extends between the first and second portions of the housing of the gas meter, the shut-off valve being coupled to the motor through the shaft,
   wherein the first physical barrier comprises a barrier o-ring positioned around the shaft between the first and second portions of the housing and wherein the second physical barrier comprises an inner o-ring positioned around the shaft between the valve and the valve housing.

2. The gas meter of claim 1, wherein the first portion comprises all spark generating equipment of the gas meter.

3. The gas meter of claim 1, wherein the gas meter is one of a residential gas meter and a commercial gas meter.

4. The gas meter of claim 1, wherein the shut-off valve is configured to shut-off pressures greater than 25 PSI.

5. The gas meter of claim 1, wherein the shut-off valve operates responsive to one or more of a direct command to shut-off, a temperature sensor, a pressure sensor and a vibration sensor.

6. A gas regulating system comprising:
   a gas meter housing comprising a first portion and a second portion, the first portion of the housing being separate and distinct from the second portion of the housing and a first physical barrier positioned between the first portion of the housing and the second portion of the housing;
   a valve housing positioned in the second portion of the gas meter housing;
   a shut-off valve positioned in the valve housing;
   a second physical barrier between the valve housing and the shut-off valve;
   a motor in the first portion of the gas meter housing and coupled to the shut-off valve and configured to activate the shut-off valve responsive to a parameter indicating to shut-off gas flowing through a gas meter; and
   a shaft that extends between the first and second portions of the housing of the gas meter, the shut-off valve being coupled to the motor through the shaft,
   wherein the motor is physically separated from gas flowing through the gas meter;
   wherein the first and second physical barriers provide the physical separation between the motor and the gas flowing through the gas meter;
   wherein the first portion of the gas meter housing further comprises a gear box coupled to the motor;
   wherein the first and second portions of the housing of the gas meter are configured to fit together as a case and cover for the gas meter and provide a single contiguous unit; and
   wherein the first physical barrier comprises a barrier o-ring positioned around the shaft between the first and second portions of the housing and wherein the second physical barrier comprises an inner o-ring positioned around the shaft between the valve and the valve housing.

7. The gas regulating system of claim 6, wherein the first portion comprises all spark generating equipment of the gas meter.

8. The gas regulating system of claim 6, wherein the gas meter is one of a residential gas meter and a commercial gas meter.

9. The gas regulating system of claim 6, wherein the shut-off valve is configured to shut-off pressures greater than 25 PSI.

10. The gas regulating system of claim 6, further comprising a plurality of sensors each configured to sense at least one of temperature, pressure and vibration and wherein the shut-off valve operates responsive to one or more of a direct command to shut-off, a temperature sensor, a pressure sensor and a vibration sensor.

* * * * *